US006817284B2

(12) United States Patent
Zittel

(10) Patent No.: US 6,817,284 B2
(45) Date of Patent: Nov. 16, 2004

(54) FOOD PROCESSING APPARATUS, TRANSPORT MECHANISM, BUCKET AND METHOD

(75) Inventor: William D. Zittel, Columbus, WI (US)

(73) Assignee: Lyco Manufacturing, Inc., Columbus, WI (US)

( * ) Notice: Subject to any disclaimer, the term of this patent is extended or adjusted under 35 U.S.C. 154(b) by 0 days.

(21) Appl. No.: 10/172,661

(22) Filed: Jun. 14, 2002

(65) Prior Publication Data

US 2003/0230198 A1 Dec. 18, 2003

(51) Int. Cl.[7] .................................................. A47J 37/12
(52) U.S. Cl. ........................ 99/405; 99/407; 99/443 C; 99/450
(58) Field of Search .......................... 99/405, 404, 407, 99/443 C, 450; 366/319, 328.2, 328.3, 328.4

(56) References Cited

U.S. PATENT DOCUMENTS

| 690,005 | A | * | 12/1901 | Anderson et al. ............. 99/404 |
| 1,381,347 | A | | 6/1921 | Schaller |
| 1,445,277 | A | | 2/1923 | Hansen |
| 1,630,676 | A | | 5/1927 | Smith |
| 2,807,203 | A | * | 9/1957 | Buechele et al. ............. 99/404 |
| 4,071,451 | A | | 1/1978 | Wood |
| 4,114,286 | A | | 9/1978 | Bingham |
| 4,157,145 | A | | 6/1979 | Jordan |
| 4,192,432 | A | | 3/1980 | Jordan |
| 4,343,700 | A | | 8/1982 | Daubman et al. |
| 5,064,536 | A | | 11/1991 | Bratten |
| 5,133,249 | A | | 7/1992 | Zittel |
| 5,146,841 | A | | 9/1992 | Zittel |
| 5,193,361 | A | | 3/1993 | Singh et al. |
| 5,305,686 | A | | 4/1994 | Svensson |
| 5,327,817 | A | | 7/1994 | Zittel |
| 5,329,842 | A | | 7/1994 | Zittel |

(List continued on next page.)

FOREIGN PATENT DOCUMENTS

EP 0065791 * 12/1982

Primary Examiner—Reginald L. Alexander
(74) Attorney, Agent, or Firm—Boyle, Fredrickson, Newholm, Stein & Gratz, S.C.

(57) ABSTRACT

A lift bucket, food product transport mechanism, food product processor and method of processing food product while providing improved dewatering. The processor is equipped with a lift that includes at least one bucket of latticework construction that preferably is made of wedgewire. The bucket has a plurality of pairs of spaced apart and interlocking wires that define dewatering perforations. In one preferred embodiment, wires defining dewatering slots are supported by wire retainers. In a preferred embodiment, each dewatering slot preferably has a width of at least 0.02 inches and no greater than about 0.13 inches. Each wire retainer can be equipped with a knife edge that minimizes dewatering flow obstruction through the slots. In a preferred method, an auger food product transport mechanism equipped with a lift bucket of the invention is rotated at a speed of at least 5 RPM.

35 Claims, 8 Drawing Sheets

U.S. PATENT DOCUMENTS

| | | | |
|---|---|---|---|
| 5,332,103 A | 7/1994 | Zittel | |
| 5,341,729 A | 8/1994 | Zittel | |
| 5,421,147 A | 6/1995 | Holden et al. | |
| 5,427,015 A | 6/1995 | Zittel | |
| 5,429,041 A | 7/1995 | Zittel | |
| 5,433,849 A | 7/1995 | Zittel | |
| 5,456,091 A | 10/1995 | Zittel | |
| 5,517,906 A | 5/1996 | Zittel et al. | |
| 5,518,614 A | 5/1996 | Zittel | |
| 5,587,073 A | 12/1996 | Zittel | |
| 5,592,869 A | 1/1997 | Zittel | |
| 5,632,195 A | 5/1997 | Zittel | |
| 5,669,288 A | 9/1997 | Zittel et al. | |
| 5,738,467 A | 4/1998 | Aidlin et al. | |
| 5,752,431 A | 5/1998 | Zittel | |
| 5,780,088 A | 7/1998 | Zittel et al. | |
| 5,809,787 A | 9/1998 | Zittel | |
| 5,989,614 A | 11/1999 | Zittel | |
| 6,047,811 A | 4/2000 | Zittel et al. | |
| 6,095,035 A | 8/2000 | Zittel et al. | |
| 6,105,485 A | 8/2000 | Zittel | |
| 6,182,833 B1 | 2/2001 | Zittel | |
| 6,187,360 B1 | 2/2001 | Zittel | |
| 6,205,913 B1 | 3/2001 | Zittel et al. | |
| 6,214,400 B1 | 4/2001 | Zittel et al. | |
| 6,234,066 B1 | 5/2001 | Zittel et al. | |
| 6,263,785 B1 | 7/2001 | Zittel | |
| 6,419,094 B1 | 7/2002 | Zittel et al. | |

* cited by examiner

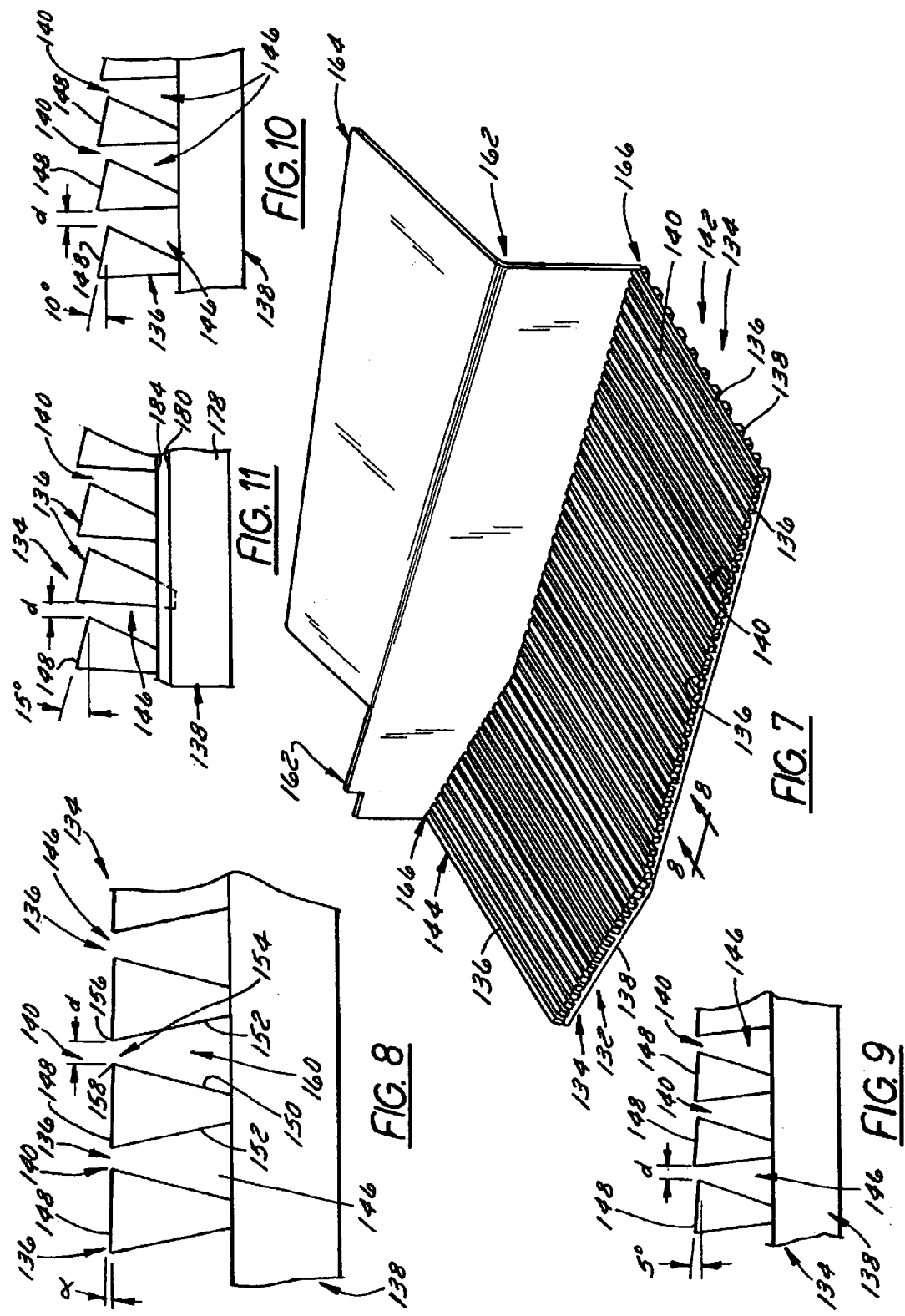

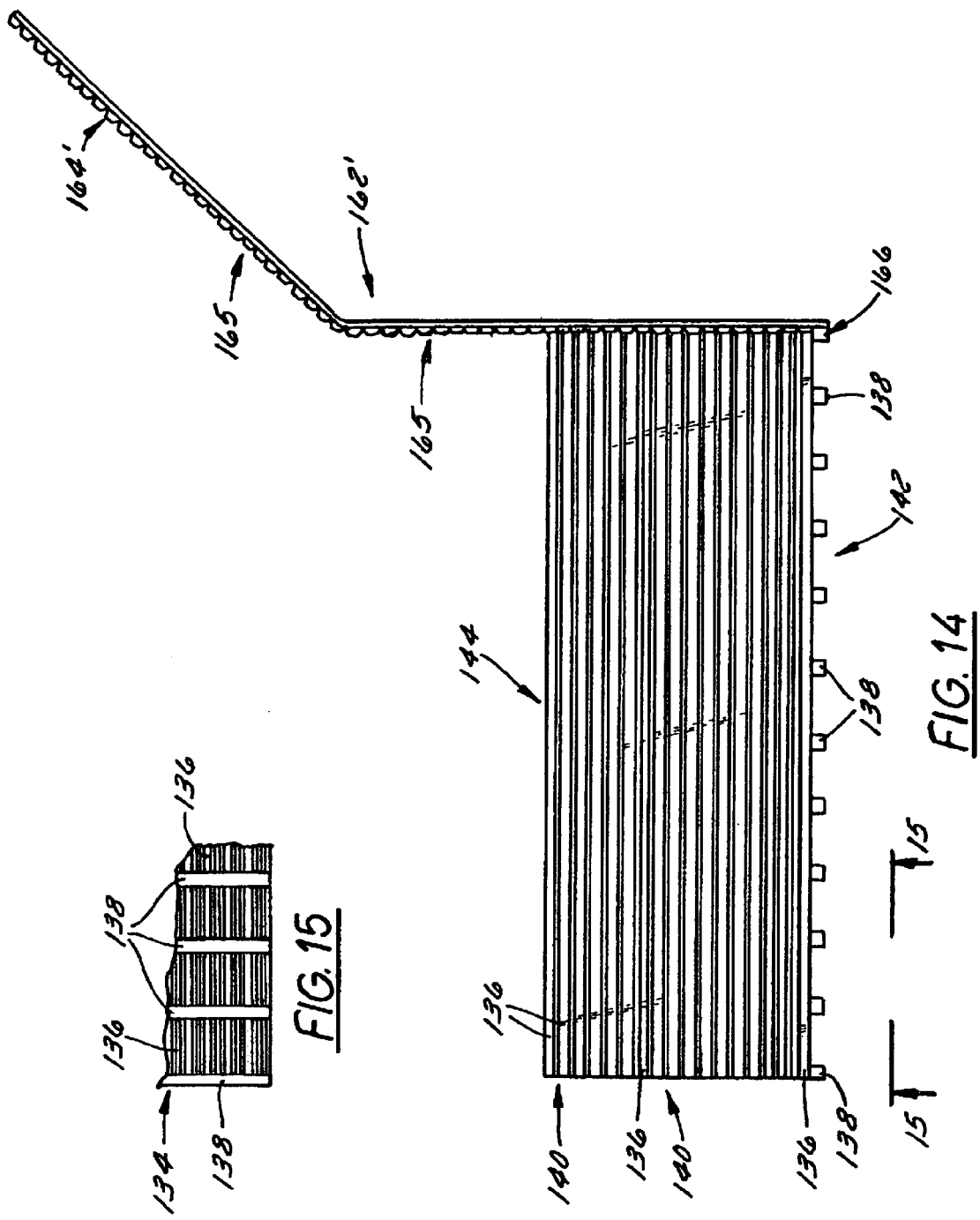

US 6,817,284 B2

FOOD PROCESSING APPARATUS, TRANSPORT MECHANISM, BUCKET AND METHOD

FIELD OF THE INVENTION

The present invention relates to a food product processing apparatus for processing food product, a food product transport mechanism, a lift used to remove food product from the apparatus, and a method of operating the apparatus, and more particularly to a food product transport mechanism for a food product processing apparatus that has a perforate lift that possesses improved dewatering capabilities.

BACKGROUND OF THE INVENTION

Commercial food processing equipment, such as blanchers, steamers, cookers, and coolers, have been used to process food product, such as pasta, vegetables, meats, sauces, juices, pastes, mixed food product, pouched food product, noodles, macaroni, and other types of food product in large quantities. Such food processing equipment usually utilizes a tank equipped with an inlet through which food product to be processed enters. A food product transport mechanism in the tank moves the food product along the tank from adjacent the inlet to adjacent an outlet where a lift is used to remove food product by delivering it to a discharge. The tank typically holds a fluid heat transfer medium that contacts the food product in the tank to process the food product by changing its temperature to heat or cool the food product.

Types of food processing equipment used to process food product using a heat transfer medium include blanchers, cookers, cooker-coolers, and steamers. A rotating auger is a preferred type of food product transport mechanism used in such equipment to urge food product from adjacent the inlet end of the tank toward the discharge end. The auger is equipped with at least one lift bucket located adjacent the discharge to scoop up and discharge food product from the tank. The lift typically comprises one or more perforate lift buckets. In many instances, the auger is equipped with several such lift buckets. While in the tank, a liquid heat transfer medium typically is used to heat the food product. The rate of rotation of the auger is selected to control the amount of time the food product resides in the tank, i.e., residency time, to help achieve a desired amount of processing.

Other types of food processing equipment are used to process food product by removing heat. For example, chillers and coolers are often used to cool food product, such as after it has been heated, so that the food product can be more quickly frozen or packaged for shipment. The food product transport mechanism, which typically also is an auger, urges food product along the tank until it is discharged by the lift. The heat transfer medium used to cool the food product typically also is a liquid.

Each lift bucket is made from a flat sheet of metal, typically of 16 gauge stainless steel, that is punched or laser cut to create several sets of dewatering perforations in it. In one known prior art lift bucket depicted in FIG. 2, each such perforation is oval in shape, extends completely through the sheet, and has a width of about ⅛ inch and a length of about ¾ inch such that the total open area of the perforations is no more than 18% of the total bucket surface area. Lift buckets of this construction having perforations with a width of 1/16 of an inch or 5/32 of an inch have also been used. The bucket also has a bend that helps contour the bucket so it facilitates discharge of the food product. An angled or inclined flange is attached to a bucket side edge to help guide food product into the bucket. The other bucket side edge is attached to an endwall of the auger located adjacent the discharge. As the lift bucket scoops up food product, the perforations dewater food product by permitting liquid heat transfer medium on the food product and on the bucket to pass through the bucket and return to the tank. By preventing loss of heat transfer medium out the tank discharge, less makeup liquid processing medium must be added to the tank during operation which thereby also reduces the energy that must be expended to heat or cool the fluid in the tank to keep it at a desired temperature.

Unfortunately, there is an auger rotational speed limit above which all of the liquid scooped up by such a prior art perforated bucket will not pass through the perforations before the bucket reaches the discharge position. This typically happens at an auger speed of between about 3 to 4 revolutions per minute (RPM), depending on the type of food product. When this happens, some of the liquid food product processing medium remains in the bucket and on food product in the bucket when the food product is discharged. As a result, some of the liquid also ends up being discharged.

When liquid food product processing medium is lost, it must be replaced. Energy must be expended to pump makeup liquid into the tank and to heat or cool the liquid until it corresponds to a desired tank temperature, all of which increases operating costs. Additionally, the auger cannot be rotated much faster than this speed limit without the buckets essentially pumping even larger amounts of liquid out the discharge. As a result, each food processing machine equipped with the aforementioned prior art lift buckets has a rotational speed limit that undesirably limits its food product processing throughput.

Unfortunately, it is believed that there is little room, if any, to improve the dewatering capacity of the prior art lift buckets. Increasing dewatering capacity is not as simple as adding more perforations or increasing the size of each perforation. Increasing the perforation width beyond ⅛ of an inch can cause food product to hang up and plug the perforations, which then significantly decreases dewatering capacity. Adding more or larger perforations beyond what is presently done causes warping of the bucket. Increasing the thickness of the steel sheet material to permit adding more or larger perforations while attempting to avoid warping also is not the answer because increasing sheet thickness limits the size of each perforation that can be punched. Generally, where the perforations are punched, the size of each perforation can be no larger than 1.5 times steel sheet thickness. The size of laser cut perforations in steel sheeting has generally been viewed as being limited in a similar manner. Additionally, even if it is assumed that these technical difficulties can be overcome, laser cutting is generally less favored than punching because it is more costly and less efficient. As a result, it is generally viewed that increased auger speeds simply cannot be attained using lift buckets of this prior art construction.

What is needed is an improved lift bucket and method of operation that permits increasing auger speeds without increasing loss of liquid from the tank.

SUMMARY OF THE INVENTION

The present invention is directed to a food product processing apparatus for processing food product, a food product transport mechanism, a lift used to remove food product from the apparatus, and a method of operating the apparatus where food product processing throughput can be increased while dewatering the processed food products being discharged. A perforate lift comprised of a perforate grid or latticework provides greater open area to increase dewatering at greater food product processing throughput rates.

In one preferred embodiment, the lift is comprised of a plurality of perforate lift buckets that each have at least 24% dewatering open area to provide increased dewatering capacity as compared to prior art lift buckets. Each lift bucket is comprised of grid structure or latticework structure. One such preferred structure includes food product carrying wires that are spaced apart to define dewatering perforations between each pair of adjacent wires. The food product carrying wires are supported by wires that preferably comprise wire retainers that can be clips that engage the food product carrying wires.

In one preferred embodiment, each perforate lift of the invention comprises a lift bucket made of a plurality of pairs of spaced apart and parallel slats that are carried by a plurality of pairs of tie beams. Each tie beam can have an engagement head that engages each slat and underlies a food product-supporting surface of each slat. In one preferred tie beam embodiment, the engagement head has a knife edge that underlies the food product-supporting surface of each slat such that the flow obstruction through each dewatering perforation caused by tie beam interruption is minimized.

A preferred lift bucket construction includes a perforate ramp that increases dewatering surface area. Preferably, both the ramp and a food product-carrying platform are of perforate construction. One preferred lift bucket construction forms the platform of perforate wedgewire. Another preferred lift bucket construction forms the ramp and platform of perforate wedgewire with a bend angling the ramp relative to the platform.

One preferred wedgewire lift bucket construction utilizes parallel screening wires that define dewatering slots that each extend substantially the length of a wire and have a width of between 0.02 inches and 0.13 inches. One preferred wedgewire lift bucket construction utilizes screening wires of generally triangular or frustoconical cross section that have a food product-carrying surface disposed at an angle of at least 2°. Another preferred wedgewire lift bucket construction utilizes generally triangular wires that have an edge or apex of each wire collectively forming the food product-carrying surface.

A lift bucket of the invention cooperates with a food product transport mechanism of a food product processing apparatus to transport food product to an outlet or discharge while returning liquid food product processing medium to the apparatus. A preferred food product transport mechanism is an auger or helical screw that carries a plurality of the lift buckets. During operation, the auger is rotated to urge food products in the apparatus toward the discharge. The lift buckets are spaced apart and preferably move in concert with the auger or screw. As the food products approach the discharge, a lift bucket lifts one or more of the food products free of the liquid processing medium and transports each food product lifted to a chute of the discharge.

A preferred food product processing apparatus includes a tank that holds the liquid food product-processing medium. The auger is disposed in the tank and the lift buckets are attached to the auger for rotation in unison therewith. During operation, a food product processing apparatus equipped with a plurality of perforate lift buckets of the invention that each have at least 24% dewatering open area rotates the auger at a rotational speed of at least five revolutions per minute without expelling liquid processing medium out the discharge.

Objects, features, and advantages of the present invention include one or more of a perforate lift bucket that has more open dewatering area for greater dewatering capacity; that is stronger and able to transport a greater load of food product to the discharge at a time; that permits faster auger rotation to increase food product processing apparatus throughput while minimizing loss of liquid processing medium; that provides greater dewatering capacity while providing greater strength and torsional rigidity; that is more robust, economical to operate, install and service, and that is long-lasting, can be retrofitted to existing food product processing apparatus installations, and is easy to assemble, install, tune, and use.

Other objects, features, and advantages of the present invention also include one or more of a food product transport mechanism equipped with a plurality of the perforate lift buckets that can be run at a faster speed or rate to increase food product processing throughput; that can be retrofitted to existing food product processing apparatus installations; that can be configured as an auger or screw that is rotated to move the lift buckets in unison therewith at a faster rotational speed; that provides improved dewatering capacity while increasing the weight or mass of food product that each lift bucket can discharge during each auger rotation; that can be economically assembled, tested, shipped and installed including in retrofit applications; and which is simple, flexible, reliable, and robust, and an apparatus which is of economical manufacture and is easy to assemble, install, and use.

Additional objects, features, and advantages of the present invention food product processing apparatus that is equipped with a food product transport mechanism having one or more of the perforate lift buckets that provide one or more of the following advantages, features and/or objects: increases dewatering capacity; increases food product transport mechanism strength and structural rigidity; increases food product transport mechanism speed and processing capacity; and is simple, flexible, reliable, and robust, and which is of economical manufacture and is easy to assemble, install, configure and use.

Other objects, features, and advantages of the present invention will become apparent to those skilled in the art from the detailed description and the accompanying drawings. It should be understood, however, that the detailed description and accompanying drawings, while indicating at least one preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which:

FIG. 7 is a perspective view of a lift bucket of the invention;

FIG. 8 illustrates a fragmentary cross sectional view of a preferred perforate structure of the lift bucket of FIG. 7 taken along line 8—8;

FIG. 9 illustrates a fragmentary cross sectional view of a second preferred lift bucket perforate structure;

FIG. 10 illustrates a fragmentary cross sectional view of a third preferred lift bucket perforate structure;

FIG. 11 illustrates a fragmentary cross sectional view of a fourth preferred lift bucket perforate structure;

FIG. 14 illustrates an end elevation view of another preferred embodiment of a lift bucket of the invention;

FIG. 15 illustrates a fragmentary view of a portion of a bottom of the lift bucket shown in FIG. 14 taken along line 15—15 of FIG. 14.

DETAILED DESCRIPTION OF AT LEAST ONE PREFERRED EMBODIMENT

Figure 1:
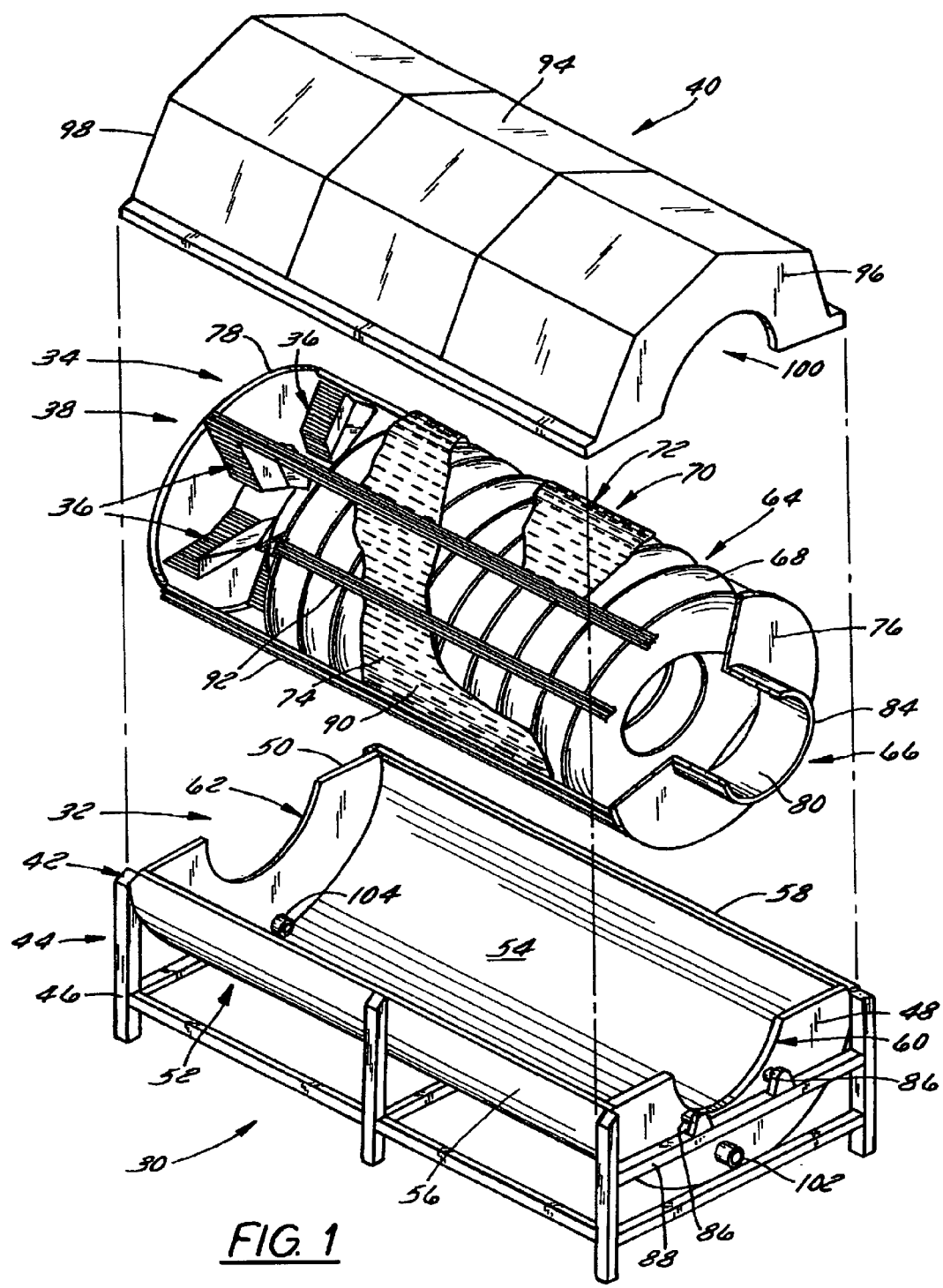
FIG. 1 is an exploded perspective view of a food product processing apparatus.
Figure 2:
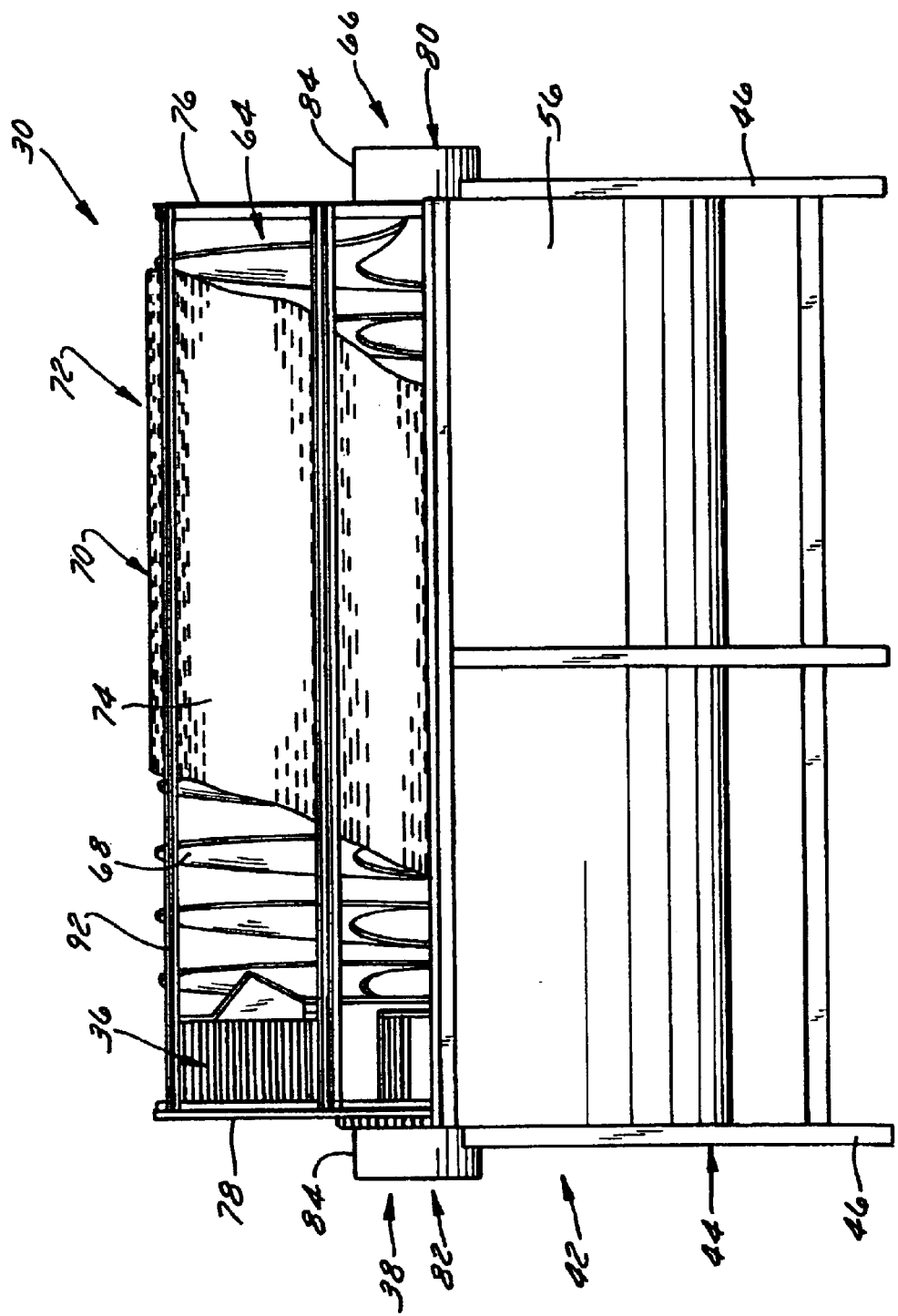
FIG. 2 is a side elevation view of the food product processing apparatus with its cover removed.
Figure 3:
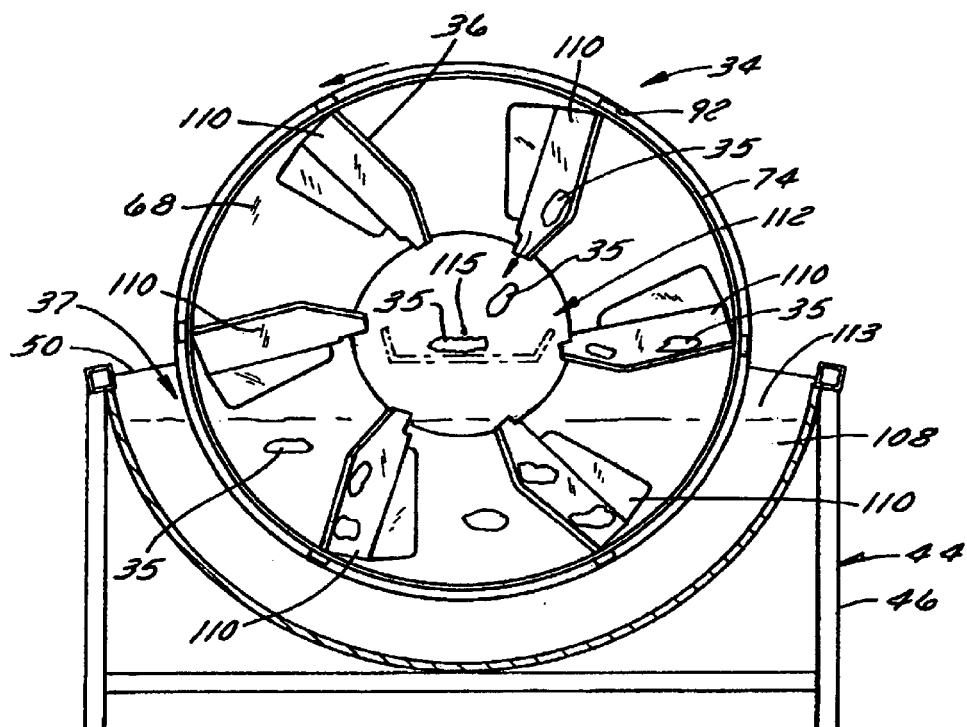
FIG. 3 is an end cross sectional elevation view of part of the food product processing apparatus located adjacent a food product discharge.

FIGS. 1 and 2 illustrate a food product processor 30 that is equipped with a processing chamber 32 and a food product transport mechanism 34 that conveys food product 35 (FIG. 3) being processed toward a lift 36 that transports the food product to a discharge 38. During operation, food product in the processor 30 is processed, such as by heating, cooling, cleaning, or washing it, before it is discharged. During operation, food product entering the processor 30 comes into contact with a processing medium 37 (FIG. 3) inside the processor. When the food product reaches the discharge 38, the lift 36 transports it to the discharge. Perforations in the lift 36 permit passage of processing medium through the lift as the food product is being transported to the discharge 38. Where the processing medium 37 is a liquid, such as is depicted in FIG. 3, perforations in the lift 36 dewater the food product 35 before it is discharged.

In the particular embodiment of the food processor 30 shown in FIG. 1, the processor is comprised of a housing that includes a cover 40 that mates or registers with a tank 42 to form the processing chamber 32 therebetween. The tank 42 is supported by a frame 44 equipped with legs 46 that rest on a surface, such as a factory floor or the ground.

The tank 42, preferably made of stainless steel or another material suitable for food product processing applications, has an inlet endwall 48 and an outlet endwall 50. An interconnecting panel 52, which can be curved or segmented, extends between endwalls 48 and 50, and defines a bottom wall 54 and lengthwise sides 56 and 58 of the tank 42. Each endwall 48 and 50 has a cutout or through opening, respectively numbered 60 and 62 in FIG. 1, which preferably is of arcuate or semicircular construction.

The food product transport mechanism 34 is disposed in the chamber 32 and preferably located between the tank 42 and the cover 40 (where a cover is provided). In the preferred processor embodiment shown in FIG. 1, the transport mechanism 34 is disposed in the tank 42 such that the cover 40 overlies it and seals with the tank during operation. The transport mechanism 34 is constructed and arranged to transport food product 35 (FIG. 3) toward the discharge 38. In the preferred processor embodiment shown in FIG. 1, the transport mechanism 34 comprises an auger or helical screw 64 that rotates during operation to urge food product entering the chamber 32 through an inlet 66 toward the discharge 38.

The auger 64 has a plurality of pairs of axially spaced apart flights 68 that preferably are interconnected. The auger 64 preferably extends substantially the length of the tank 42. Preferably, the auger 64 has at least four flights and can have as many as twenty flights or more depending upon the application and length of the processor. While flights 68 can be supported by an elongate and generally cylindrical core (not shown), the auger 64 can be of a coreless or self-supporting construction, such as is the case for the auger 64 shown in FIG. 1.

Where a support core (not shown) is used, the core preferably is centrally located along an axis of rotation of the auger 64. Typically, flights 68 of the auger are mounted to the core. For example, a bond, such as a weld or the like, can be used to attach flights 68 to the core.

In the preferred embodiment of the processor 30 shown in FIG. 1, the auger 64 is enclosed in a food product transport mechanism housing 70 that preferably comprises a drum 72. The drum 72 has a sidewall 74, an inlet endwall 76, an outlet endwall 78, and inlet and outlet openings 80 and 82 (FIG. 2), through which food product is respectively introduced into and discharged from the tank 42 and preferably the processor 30. Annular drum journals 84 extend from each end of the drum 72 beyond each drum endwall 76 and 78. Each journal 84 provides a support surface upon which the weight of as much as substantially all or all of the transport mechanism 34 can rest, particularly while it is rotating during operation. Preferably, each journal 84 is rotatively supported on spaced apart trunnions 86 which are shown mounted to a horizontal brace 88 of the frame 44. The trunnions 86 preferably are positioned so that the weight of the drum 72 does not fully rest upon tank endwalls 48 and 50.

Referring additionally to FIG. 3, the drum 72 is constructed and arranged to receive a plurality of pairs of food products 35 and enough processing medium 37 such it can contact and preferably surround food product within the drum during operation. In its preferred embodiment, the drum 72 is of perforate construction. For example, the drum sidewall 74 preferably is made of perforated paneling, such as perforate stainless steel paneling, mesh, or a screen-like material in order to contain food products 35 in the drum 72 being processed while at the same time permitting processing medium 37 to enter to contact them.

The drum sidewall 74 has a plurality of pairs of perforations 90 (FIG. 1) through which processing medium 37 within the processor 30 can flow. Depending on the type of food product being processed, as well as whether and how it is packaged, the size and shape of these perforations can vary. For example, the size of each perforation 90 can range from as small as $\frac{1}{16}$ of an inch, for relatively small food product, such as rice, to as large as $\frac{1}{2}$ inch or more for larger food products, such as hot dogs or the like.

Particularly where the auger 64 is of coreless construction, a plurality of spaced apart elongate struts 92 preferably are used to strengthen and structurally rigidify the drum 72 and auger 64. Where such struts 92 are used, one or more of the struts preferably extend from one drum endwall 76 to the other endwall 78. These struts 92 can also serve as mounts to which the perforate drum sidewall 74 can be attached. For example, in one preferred food product processor embodiment (not shown), the sidewall 74 is comprised of perforate panels fastened to the struts 92 in a manner that enables them to be easily removed for cleaning and food processor servicing.

Where the processor is equipped with a cover 40, it preferably is of elongate and vaulted construction so as to fit over and completely cover the tank 24 so as to help define the processing chamber 32. The cover 40 has an elongate sidewall 94 disposed between a pair of endwalls 96 and 98 that are each equipped with a semi-circular opening or cutout 100. When the cover 40 is closed, one of these openings overlies a corresponding tank endwall opening. When closed, one of the drum journals 84 extends outwardly beyond the endwalls of the cover 40 and the tank 42.

The cover 40 can be attached to the tank 42 in a manner such that it can be moved relative to the tank 42 to permit access to the interior of the processor 30. The cover 40 can be attached to the tank 42 or it can be attached using pneumatic or hydraulic cylinders, or the like, such that it can be lifted free of the tank.

The processor 30 preferably also has an inlet port 102 permitting introduction of processing medium 37 into the tank 42 and an outlet port 104 through which the processing medium can be withdrawn. If desired, there can be a constant flow of the processing medium 37 through the processor 30. These ports 102 and 104 can also be used to help clean the tank 42.

As is shown in FIG. 2, one of the journals 84 carries a sprocket 106 that receives motive power from a prime mover (not shown), such as a motor or the like, via an endless flexible member (not shown), such as a chain or belt, which causes the auger 64 to rotate. If desired, a direct drive arrangement can be used. During operation, the auger 64 is rotated at a speed that is selected based upon factors such as the type, size, viscosity, drag, and mass of the food product 35 being processed, processing medium temperature, processing efficiency, and other characteristics. The auger speed and length of the processor 30 are two principal factors that determine the residency time of each food product 35 within the processor, which thereby determines how long each food product 35 is exposed to processing medium 37 inside the processor.

Food products 35 enter the processor 30 through the inlet 66 preferably substantially continuously. After entry, the food products 35 come into contact with processing medium 37 in the tank 42. Preferably, each food product 35 is substantially completely immersed in the processing medium 37.

In the preferred embodiment shown in FIG. 3, the processing medium 37 comprises a heat transfer medium 108 that preferably is a liquid. One preferred liquid heat transfer medium 108 is water that has been heated or cooled to a desired temperature or temperature range such that food product 35 passing through the processor 30 is correspondingly processed in a desired manner.

If desired, the processing medium 37 can be supplemented. For example, where the processing medium 37 comprises a heat transfer medium 108, a vapor, such as steam, and/or gas, such as air, can be used to help facilitate food product heat transfer. If desired, auger flight baffles (not shown) or agitation can also be employed to help effect heat transfer.

As the auger 64 rotates, it urges food products 35 inside the processor 30 toward the discharge 38. As the food products 35 travel along the processing chamber 32, the processing medium 37 treats the food products 35. For example, where the processing medium 37 comprises a liquid heat transfer medium 108, the temperature of each food product 35 is desirably changed in a manner that heats or cools it.

For example, where the processor 30 is a blancher or cooker, the processing medium 37 is a liquid heat transfer medium 108 that is heated to a temperature that desirably heats, blanches, or cooks the food products. Where the processor 30 is a blancher or cooker, the liquid heat transfer medium 108 preferably comprises water that is heated to a temperature of at least 170 degrees Fahrenheit.

Where the processor 30 is used to clean food products 35, the processing medium 37 can be a liquid that preferably is comprised of water that can include a cleansing agent or the like. As the food products 35 travel along the processing chamber 32, the processing medium 37 cleans the food products before they are discharged.

Where the processor 30 is used to cool food products 35, the processing medium 37 is a liquid heat transfer medium 108 that is cooled to a temperature that desirably lowers the temperature of food products passing through the chamber 32. One preferred liquid heat transfer medium 108 is comprised of water that can be comprised of a coolant such as an alcohol-based coolant or the like.

When the rotating auger 64 causes food products 35 to approach the discharge 38, a lift 36 transports each food product 35 toward and out the discharge 38. In the preferred lift embodiment shown in FIG. 3, the lift 36 is comprised of a plurality of spaced apart and perforate lift buckets 110. In the preferred embodiment shown in FIG. 3, the lift 36 is comprised of six lift buckets 110. If desired, a food product processor can be equipped with as many as eight or more such buckets 110.

The auger 64 is depicted in FIG. 3 as rotating in a counterclockwise direction. As the auger 64 rotates, each lift bucket 110 enters the processing medium 37. Further auger rotation moves a bucket 110 entering the processing medium 37 toward one or more food products 35 disposed in the medium. As the bucket 110 is further displaced, it comes into contact with one or more food products 35 and begins urging them in an upward direction. As the bucket 110 begins moving in an upward direction, it scoops up one or more food products 35 and begins lifting them. Further rotation of the bucket 110 lifts each food product 35 free of a processing medium line 113 until each food product 35 on the bucket begins sliding toward a generally centrally located discharge chute 112.

For example, as is shown in FIG. 3, rotation of a lift bucket 110 counterclockwise to about the 2 o'clock position causes food products 35 on the bucket to slide downwardly toward the axis 115 of rotation of the auger 64. Each food product 35 on this bucket 110 falls from the bucket onto the discharge chute 112, where it then travels out the discharge 38. In one preferred embodiment, the chute 112 is inclined such that food product 35 landing on the chute slides along chute until being expelled out the discharge 38.

Figure 4:
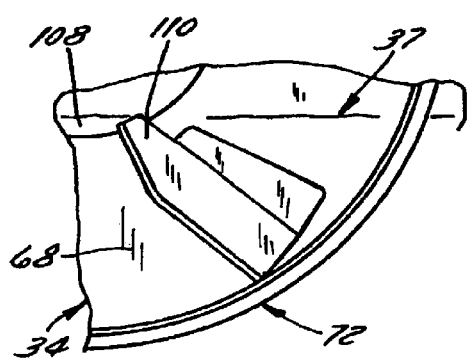
FIGS. 4 and 5 are fragmentary end cross sectional end views of a food product processing apparatus showing lift buckets disposed at different angles.
Figure 5:
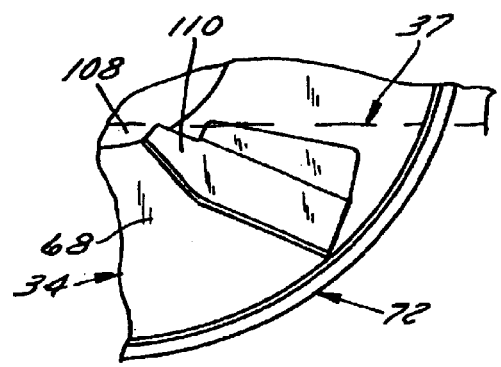

Referring additionally to FIGS. 4 and 5, the angle that each bucket 110 is oriented relative to the auger can be varied depending on factors, such as, the type of food product, food product shape, mass, the friction between food product and the bucket 110, the food product texture and/or packaging material, the type of processing medium 37, e.g., its viscosity, as well as other factors. For example, lift bucket angle can vary from between about 25 degrees and about 32 degrees, such as is generally depicted by the lift buckets 110 shown in FIGS. 4 and 5.

Figure 6:
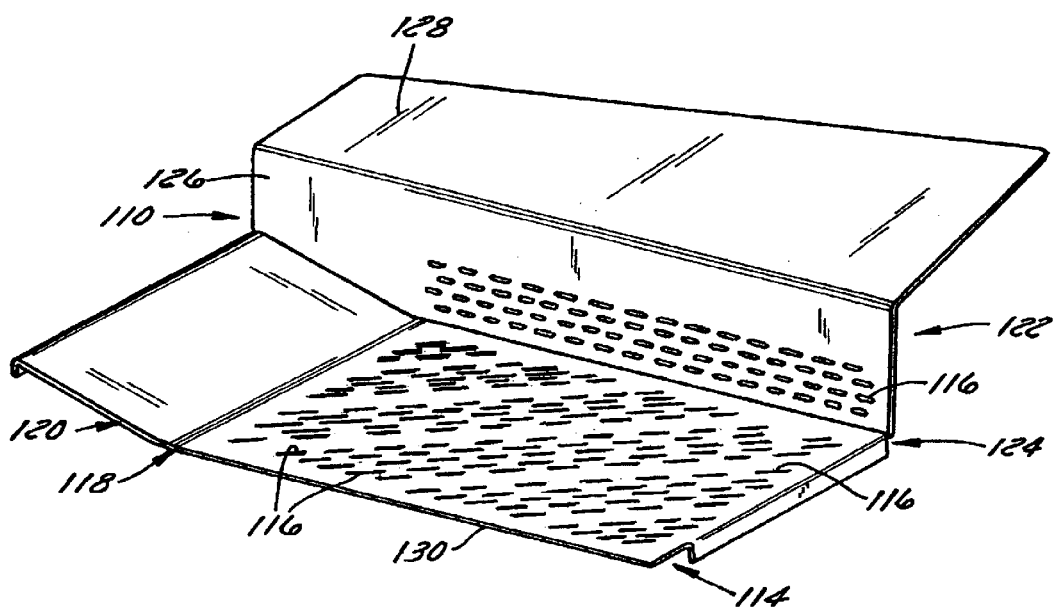
FIG. 6 is a perspective view of a prior art lift bucket.

FIG. 6 illustrates a prior art lift bucket 110. The bucket 110 is made from a flat sheet 114 of stainless steel that is punched or cut to form several sets of perforations 116 in the sheet. Each perforation 116 is oval in shape, extends completely through the sheet 114, and has a width no greater than about ⅛ inch and a length of about ¾ inch such that the total open area of all of the perforations 116 in the bucket 110 is no more than 18% of the total bucket surface area. Slot widths of 5/32 of an inch and 1/16 of an inch have also been employed. The bucket 110 also has a bend 118 that divides the sheet into a second solid segment 120 that provides a ramp to help guide food products 35 sliding off the bucket 110 toward the discharge 38.

The prior art bucket 110 has an angled flange 122 attached to a side edge 124 of the sheet 114 to help guide food product 35 into the bucket. The flange 122 includes an uprightly extending panel 126 that is generally perpendicular to sheet 114 and an inclined panel 128, typically referred to as a "wing," that flares away from the sheet to help direct more food product toward the bucket.

As is more clearly depicted in FIG. 3, each bucket 110 is attached along one side to a flight 68 of the auger 64. As is shown more clearly in FIGS. 1 and 2, each bucket 110 is attached along its other side to the discharge endwall 78 of the drum 72. Although not shown in FIG. 6, a side edge 130 of the sheet 114 is attached to the endwall 78 by a weld.

During processor operation, each bucket 110 moves in unison with the auger 64 to pick up food product 35 disposed in a liquid processing medium 37 that has been urged by the auger adjacent the discharge 38. As the bucket 110 exits a waterline 113 of the liquid processing medium 37, scooped up food product 35 and some liquid processing medium are picked up by the bucket. Most of the liquid processing medium picked up by the bucket 110 passes through perforations 116 in the bucket before falling under the influence of gravity back toward the waterline 113.

However, some of the liquid processing medium 37 will remain clinging to the bucket 110 because of surface tension between it and the bucket. The amount that remains clinging was never really heretofore considered a performance issue because, in the past, the auger rotated at slow enough speeds such that only a relatively small amount of liquid processing medium 37, if any, was ever discharged from the processor 30. However, as attempts have been made to increase food product processor throughput by increasing auger speed, it has become apparent that the use of prior art lift buckets 110 cause a significant performance penalty by discharging ever increasing amounts of liquid processing medium out tank 42. It is believed that this is occurring because more and more liquid processing medium remains on each bucket 110 a longer period of time before sliding off the bucket 110 or passing through the perforations 116 and falling from the bucket 110. As a result, more and more liquid processing medium ended up falling onto the discharge chute 112.

Simply making the perforations larger is not presently viewed as being a viable solution because it would structurally weaken the bucket 110 such that its load carrying capacity is limited at such increased auger speeds without the risk of bending or breaking. In view of these inherent structural and performance limitations of prior art lift buckets, a solution was needed that permitted faster auger speeds, that provided greater load carrying capacity, and which had improved dewatering capabilities.

Figure 16:
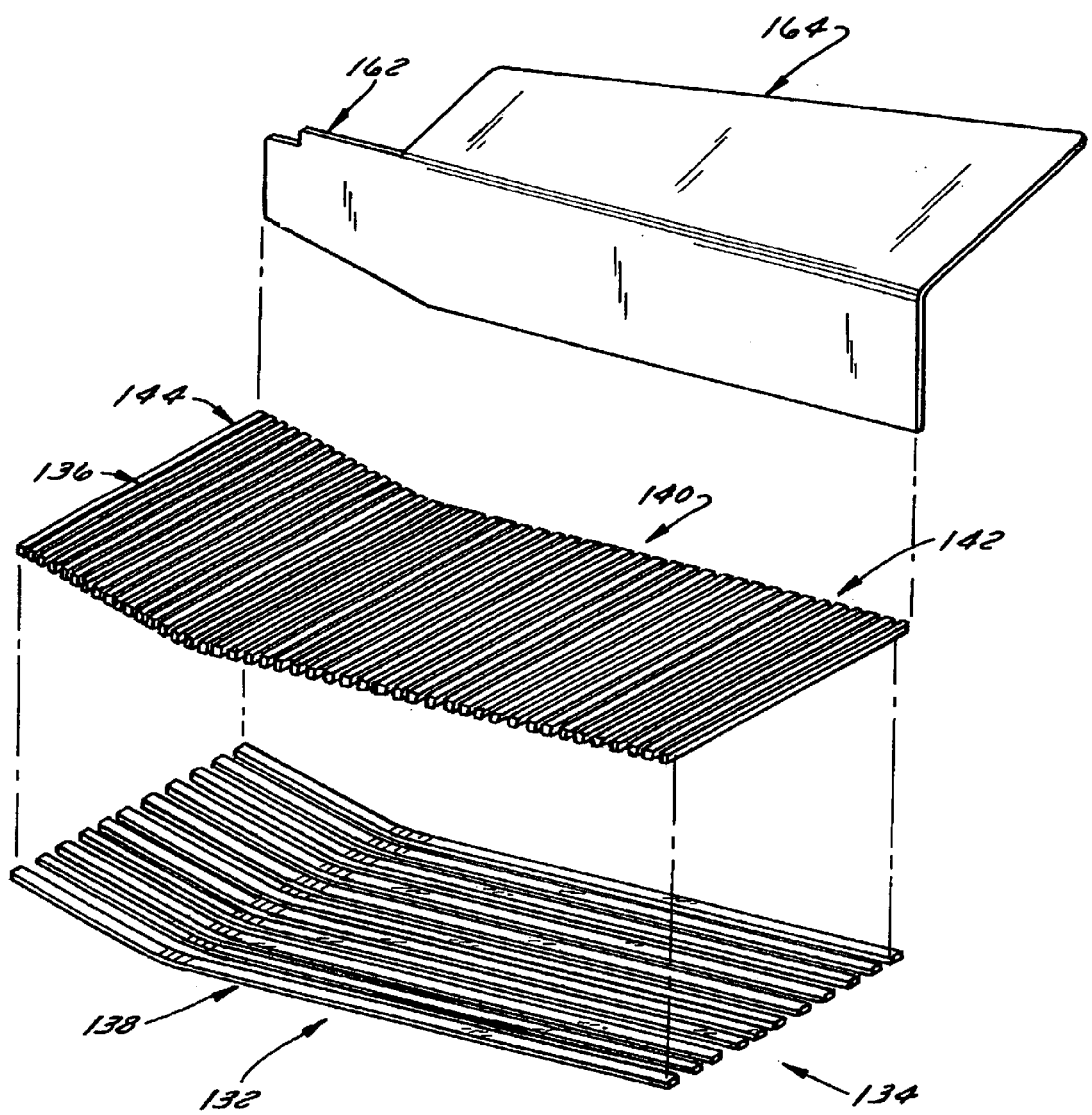
FIG. 16 illustrates an exploded perspective view of a preferred embodiment of a lift bucket of the invention.

FIGS. 7, 14, and 16 illustrate preferred embodiments of a lift bucket 132 of the invention that is comprised a perforate latticework 134 that includes at least a plurality of pairs of wires 136 and 138 spaced apart so as to define dewatering perforations 140 therebetween with at least a plurality of the wires 136 and 138 being interconnected. The bucket 132 has a food product-receiving platform 142 that is comprised of perforate latticework 134. In addition and unlike the prior art, the bucket 132 includes a perforate ramp 144 that preferably is also comprised of perforate latticework 134.

Providing a lift bucket 132 with a ramp 144 of perforate latticework construction advantageously increases dewatering open area of the bucket 132 and extends dewatering time, i.e., the amount of time the bucket 132 can return liquid processing medium to the tank 42 before the ramp becomes positioned too far relative to the discharge chute 112. As a result, improved dewatering is achieved because dewatering open area is greater and dewatering time is kept the same or extended, even where the speed of the food product transport mechanism 34, e.g., the auger, has been increased, thereby enabling a greater volume of liquid to be returned. This is true even where the dewatering rate is reduced, such as due to the type of liquid processing medium being used. For example, providing a perforated lift bucket ramp 144 advantageously produces a more versatile bucket 132 as it can be used with a liquid processing medium having a viscosity that is thicker than water or which possesses more clingy surface tension characteristics than water while still being able to adequately dewater food products 35 being discharged without loss of processing medium.

FIG. 8 illustrates a preferred cross section of the lift bucket 132. The perforate latticework 134 is formed by a plurality of pairs of generally parallel and spaced apart food product carrying wires 136 that function like, for example, louvers to support food products 35 thereon while permitting atmosphere, vapor, such as vaporous food product processing medium, and/or liquid food product processing medium to be returned to the processing chamber 32 and/or tank 42 during operation. The perforations 140 are defined by the spaces between adjacent wires 136 and are constructed so as to permit atmosphere, vapor and liquid to slide off and pass through the bucket 132. The wires 136 are carried by interconnecting support wires 138 that are spaced apart so as to only periodically interrupt the perforations 140 while imparting strength and support. Although only one such support wire 138 is shown in FIG. 8, each bucket 132 has a plurality of pairs of wires 138 that engage wires 136.

In one preferred embodiment, each wire 136 comprises a slat that preferably is attached to a support wire 138, which comprises a tie beam. The slats 136 engage the tie beams 138 to form a perforate grid structure 134. Each perforation 140 comprises an elongate dewatering slot 146 that preferably extends substantially the length of an adjacent slat 136.

In the preferred embodiment depicted in FIG. 8, each slat 136 has a generally triangular or frustoconical cross-section. Each slat 136 has an outer face 148 that is substantially flat so as to, for example, facilitate sliding of food product 35 during discharge. Each slat 136 has a pair of sidewalls 150, 152 that taper toward each other. As a result, each dewatering slot 146 has a throat 154 disposed between adjacent slat edges 156, 158 that widens into a larger dewatering chamber 160 downstream of the throat. Depending upon the volume of liquid processing medium picked up by the lift bucket 132, the generally triangular dewatering chamber cross section can create a pressure drop downstream of the throat 154 that helps pull liquid processing medium 37 through the throat 154 of the slot 146, which can also increase dewatering capacity and throughput. Tapering sidewalls 150, 152 provide increased wetting surface area that, in effect, facilitates dewatering by helping to "pump" or draw liquid processing medium downstream of the throat into the chamber 160 to help increase dewatering throughput and capacity. The combination of each slot 146 expanding downstream of the throat 154 and tapering sidewalls 150, 152 thereby increase the volumetric flow rate of liquid processing medium 37 that can pass through each lift bucket 132 of the invention during food product discharge. As a result, an auger 64 equipped with lift buckets 132 of the invention can be rotated at a speed that is at least 10% faster than the same auger 64 equipped with prior art lift buckets 110 without the buckets 132 pumping liquid processing medium 37 out the discharge 38. Preferably, the auger is rotated at a speed that is at least 25% faster and that is at least 5 RPM.

In the preferred lift bucket cross section shown in FIG. 8, the exterior surface 148 of each slat 136 is disposed at an angle, α, relative to tie beam 138 and the width, d, of the throat of each slot, i.e., minimum slot width, is at least 0.02 inches. In one preferred embodiment, the outer surface 148 of at least a plurality of slats 136 is disposed at an angle, α, of at least 2° and the width, d, of the slots 146 defined by these slats is at least 0.03 inches. Such an arrangement produces a lift bucket having an open dewatering area that is at least 24% of the total lift bucket surface area and causes the lift bucket 132 to perform like a lift bucket that effectively has an open dewatering area of at least 30%.

Each slat 136 has a cross sectional thickness of at least 0.03 inches adjacent its base where it engages a tie beam 138 and a cross sectional thickness of at least 0.05 inches at its outer surface 148. Each slat 136 preferably extends upwardly from a tie beam 138 to which it is engaged at least 0.1 inches. In the preferred embodiment depicted in FIG. 8, each slat 136 has a cross sectional thickness adjacent its base of about 0.05 inches, an exterior surface cross sectional thickness of about 0.1 inches, and a height of about 0.2 inches. In the preferred embodiment depicted in FIG. 8, each slat 136 and tie beam 138 is made of metal, preferably a stainless steel, which preferably is comprised of 304 or 316 stainless steel. In the preferred embodiment depicted in FIG. 8, each slat 136 engages at least a plurality of tie beams 138 using a bond that preferably is a weld or the like. In the preferred embodiment depicted in FIG. 8, each slat 136 preferably is welded to every tie beam 138.

Figure 13:
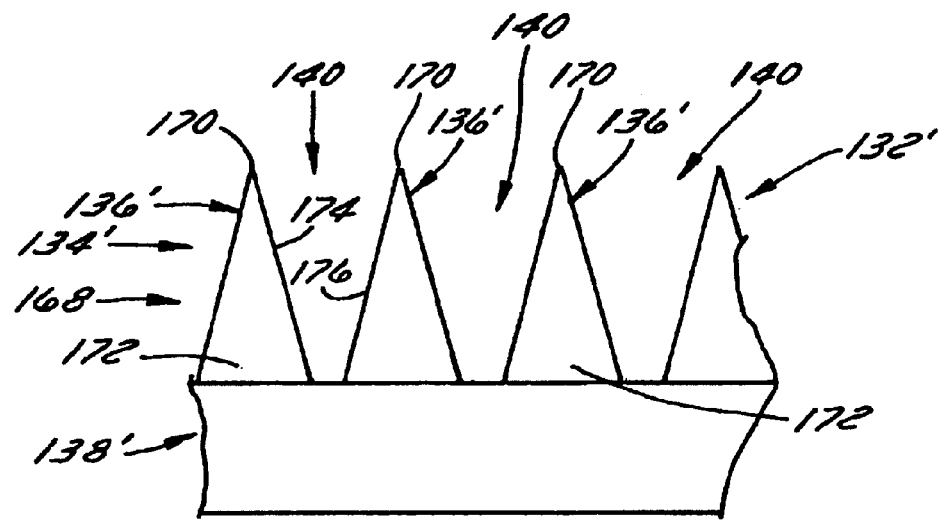
FIG. 13 illustrates a fragmentary cross sectional view of a fifth preferred lift bucket perforate structure.
Figure 12:
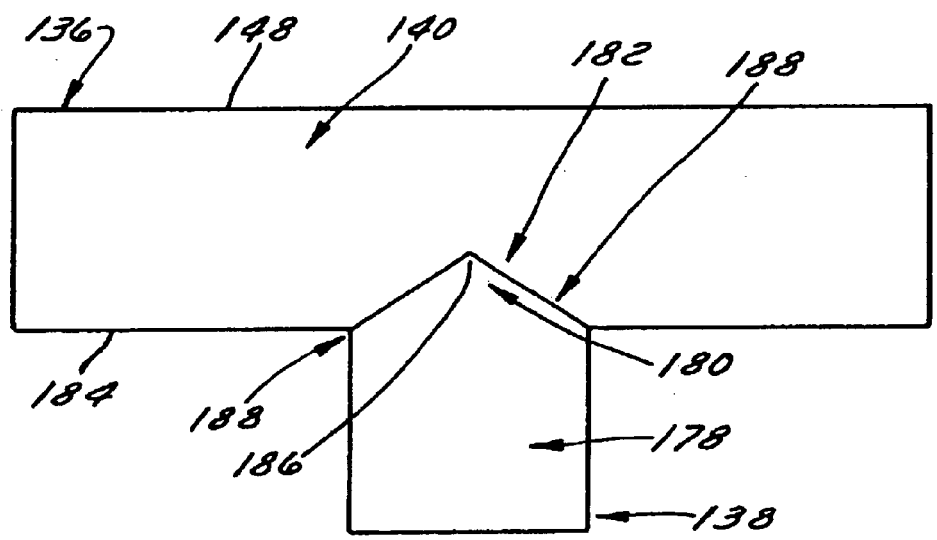
FIG. 12 is a fragmentary end view of a portion of the preferred lift bucket perforate structure shown in FIG. 11 taken along line 12—12 of FIG. 11.

In the preferred embodiment shown in FIG. 8, each tie beam 138 extends across at least a plurality of pairs of slats 136. Referring more particularly to FIGS. 13 and 14, each tie beam 138 extends transversely across each and every slat 136 and underlies each slat 136. In one preferred embodiment, each tie beam 138 has a height of at least 0.15 inches and a thickness of at least 0.1 inches. In the preferred embodiment shown in FIG. 8, each tie beam 138 has a thickness of about 0.25 inches and a thickness of about 0.18 inches. The tie beams 138 preferably are parallel and spaced apart at least 0.75 inches. In the preferred embodiment depicted in FIG. 8, pairs of adjacent tie beams 138 have a center-to-center spacing of about 0.9 inches. Referring additionally to FIGS. 11 and 12, one edge 184 of each tie beam 138 preferably is disposed in a notch 182 (FIG. 12) in each slat 136 engaging each slat 136. Preferably, each tie beam 138 is disposed in a notch 182 in each slat 136 and welded to each slat such as by using a laser welding, electron beam welding or another high energy density beam welding process.

In one preferred embodiment, at least the food product-receiving platform 142 is made of a section of substantially rigid wedgewire 134 that has a plurality of pairs of substantially parallel screening wires 136 located and held in place by a plurality of parallel support wire clips 138. Each one of the wire clips 138 preferably is disposed generally perpendicularly relative to each one of the screening wires 136. Preferably, both the platform 142 and the ramp 144 are made of a single piece of wedgewire 134 that is bent transversely relative to the screen wires 136 to angle the ramp 144 relative to the platform 142.

The lift bucket 132 preferably also includes a flange 162 that has an angled section 164 that forms a wing. The flange 162 is attached to one edge 166 of the wedgewire portion of the bucket 132. The flange 162 preferably is made of metal that preferably also is a stainless steel or another food grade material. While the flange 162 is depicted in FIG. 8 as being constructed of a solid sheet of material, the flange 162, including the wing section 164 can also be made of perforate wedgewire 165, such as the case for the flange 162' depicted in FIG. 14. Such a wedgewire flange construction preferably further helps facilitate dewatering.

FIG. 9 illustrates a lift bucket wedgewire cross-section having an outer surface 148 disposed at an angle of at least 5° with each slot 146 having a width, d, of at least 0.05 inches. FIG. 10 illustrates a lift bucket wedgewire cross-section having an outer surface 148 disposed at an angle of at least 10° with each slot 146 having a width, d, of at least 0.1 inches. FIG. 11 illustrates a lift bucket wedgewire cross-section having an outer surface 148 disposed at an angle of at least 150 with each slot 146 having a width, d, of no more than about 0.13 inches. The choice of angle, slot width, and wire thickness will depend upon the amount of dewatering desired, which in turn depends upon factors that include auger speed, the type of liquid processing medium, the type and size of food product, as well as how heavily the processor 30 will be loaded during operation.

FIGS. 11 and 12 also illustrate a preferred arrangement for facilitating engagement between food product receiving wire 136 and wire clip 138. Each wire clip 138 is substantially rigid and has a generally rectangular base 178 with a generally necked down or tapered engagement head 180. Preferably, the head 180 is generally triangular in cross section and fits in a complementarily shaped detent or notch 182 (FIG. 12) in a bottom edge 184 of each wire 136. Each wire 136 preferably also is substantially rigid. The generally triangular engagement head 180 has a relatively thin edge or apex 186 that minimizes liquid processing medium flow obstruction in that portion of each elongate rectangular slot 146 that is interrupted by the wire clip 138. As a result, dewatering capacity and throughput is further maximized.

A weld preferably is disposed between each interface 188 between wires 136 and 138 so as to join both together. As a result, a food product-receiving platform 142 of rigid and self-supporting construction is produced. Preferably, this method of manufacture produces an integrally formed platform 142 and ramp 144 of one-piece and perforate construction that is rigid, strong, tough, and resilient.

In one preferred method, a plurality of lift buckets 132 with wires 136 having outer surfaces 148 with various angles are employed to determine what outer surface area is closest to optimum for a given type of food product that will be processed. Each angle is tried along with different bucket-to-auger mounting angles to determine when the food product will begin sliding downwardly toward the discharge 38. The rate of change of the angle of the lift bucket 132 during simulated movement is also tested to attempt to determine the optimum wire surface angle for a particular auger speed and food product. In this manner, such a method of the invention can be used to tune lift bucket operation and performance for a wide range of operating conditions and food products.

FIG. 13 illustrates another preferred cross section of a lift bucket 132' of the invention. The lift bucket 132' is comprised of a section of wedgewire 168 that is made of a plurality of pairs of substantially rigid and generally triangular wires 136' supported by a plurality of pairs of substantially rigid and generally rectangular wire clips 138'. Wires 136' preferably are generally triangular in cross section and have an apex 170 facing toward and coming into contact with food product 35 on the bucket 132' being discharged. If desired, each wire 136' can be constructed without an apex such that it has a generally frustoconical cross section with its wider base 172 being attached to the wire clips 138'. If desired, each clip 138' can have an engagement head that fits in a notch in a wire 136'. The sidewalls 174 and 176 of each wire 136' are inclined such that they preferably slope from the apex 170 so as to help drain liquid processing medium from the food product carrying surface of the bucket 132'. Edge contact between apex 170 and food product 35 also helps pull liquid processing medium 37 from the food product 35 to facilitate dewatering.

During food processor operation, food products 35 enter the processor 30 through the inlet 66. The food products 35 drop into the food product processing medium 37 to be processed. The auger 64 rotates causing the auger flights 68 to urge the food products 35 along the length of the processing chamber 32. As the food products 35 travel along the chamber 32, the processing medium 37 contacts the food products. During contact with the processing medium 37, the food products 35 are processed. After the auger 64 has urged the food products 35 to the discharge end, a lift bucket 132 or 132' of the invention scoops up at least a plurality of food products from the processing medium 37. As the bucket 132 or 132' exits the processing medium 37, processing medium carried by the bucket passes through the elongate perforations 140 in the bucket before falling downwardly back into the tank 42. Further rotation of the auger 64 causes the food products 35 to slide radially inwardly toward the discharge chute 112. At some point, the food products 35 fall onto the chute 112, where they are thereafter expelled out the discharge 38.

A lift bucket 132 or 132' of the invention constructed in accordance with one of the preferred lift bucket embodiments disclosed herein is stronger than prior art lift buckets 110 and provides increased dewatering capacity. This means that more food product 35 can be processed substantially simultaneously in a continuous flow manner by a food processor 30 equipped with lift buckets 132 or 132' of the invention because each bucket can scoop up and discharge more food product 35 during each auger rotation while better dewatering the food products 35 being discharged such that a minimum of liquid processing medium 37 passes out the discharge. Preferably, no liquid processing medium 37 is discharged due to the increased dewatering open area and the increased effective dewatering open area of each bucket 132 or 132'. As a result of the increased strength provided by a lift bucket 132 or 132' made in accordance with the invention, the bucket 132 or 132' can lift and discharge food product 35 weighing at least 10% more per auger rotation as compared to a prior art lift bucket 110 used to discharge the same type food product 35. In one preferred method, a lift bucket 132 or 132' of the invention having a platform 142 comprised of wedgewire having a width of about 10.5 inches and a length of about 11.75 inches and a ramp 144 comprised of wedgewire having a width of about 10.5 inches and a length of about 5 inches can carry at least 45 pounds of food product 35. All of this is achieved while being able to rotate the auger at least 10% faster. In one preferred method of operation, an auger 64 equipped with a plurality of lift buckets 132 or 132' of the invention is rotated at a rotational speed of at least 5 RPM without discharging liquid processing medium. As a result, food product processor throughput is significantly increased while minimizing and preferably preventing discharge of liquid processing medium.

It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A food product processing apparatus having an inlet and a discharge comprising:
   a food product processing chamber receiving a plurality of food products through the inlet;
   a liquid disposed in the chamber;
   a food product transport mechanism for moving the food products along the chamber;
   a perforate lift comprised of wedgewire carried by the food product transport mechanism that transports at least one of the food products toward the discharge wherein the wedgewire has a non-uniform, non-circular cross-section.

2. A food product processing apparatus having an inlet and a discharge comprising:
   a food product processing chamber receiving a plurality of food products through the inlet;
   a liquid disposed in the chamber;
   a food product transport mechanism for moving the food products along the chamber;
   a perforate lift comprised of wedgewire carried by the food product transport mechanism that transports at least one of the food products toward the discharge, wherein the lift comprises a plurality of pairs of spaced apart wires defining a plurality of pairs of dewatering perforations and a plurality of pairs of wire clips that engage the wires.

3. The food product processing apparatus according to claim 2 wherein a plurality of the wires have a generally triangular or frustoconical cross-section.

4. The food product processing apparatus according to claim 3 wherein each one of the plurality of the wires has a food product supporting surface that is disposed at an angle relative to a longitudinal axis of one of the wire clips.

5. The food product processing apparatus according to claim 2 wherein a plurality of the wires have a notch and a plurality of the wire clips further comprise an engagement head that is received in one of the notches to engage the wire clips to the wires.

6. The food product processing apparatus according to claim 5 wherein the engagement head comprises a knife edge that is received in the notch of each one of the plurality of wires.

7. The food product processing apparatus according to claim 6 wherein the plurality of wire clips is welded to the plurality of wires.

8. A food product processing apparatus having a discharge and comprising a processing chamber in which a food product being processed is disposed, and a food product transport mechanism that urges the food product toward the discharge with the food product transport mechanism having a lift that is comprised of perforate latticework, wherein the food product transport mechanism comprises an auger and the lift comprises a plurality of spaced apart wedgewire lift buckets carried by the auger.

9. A food product processing apparatus according to claim 8 wherein the processing chamber holds a liquid processing medium therein and the perforate latticework comprises a plurality of pairs of interconnected wires.

10. A food product processing apparatus according to claim 9 wherein the plurality of pairs of interconnected wires comprises a plurality of pairs of spaced apart slats that are attached to a plurality of pairs of spaced apart tie beams.

11. A food product processing apparatus according to claim 10 wherein the plurality of pairs of slats are parallel and oriented in one direction and the plurality of pairs of tie beams are parallel and oriented in another direction.

12. A food product processing apparatus according to claim 11 wherein the plurality of pairs of spaced apart slats are oriented generally perpendicular to the plurality of pairs of tie beams.

13. A food product processing apparatus according to claim 8 wherein each wedgewire lift bucket further comprises a flange projecting outwardly from one edge that has an inclined segment forming a wing.

14. A food product processing apparatus according to claim 13 wherein the flange is comprised of wedgewire.

15. A food product processing apparatus having an inlet and a discharge and that processes a plurality of food products comprising:
a tank;
a cover that overlies the tank and defines a food product processing chamber therebetween;
a liquid heat transfer medium disposed in the tank that contacts the plurality of food products to change the temperature of the plurality of food products;
a helical auger disposed in the tank that is rotated to urge the plurality of food products toward the discharge;
a plurality of pairs of spaced apart perforate wedgewire lift buckets carried by the auger for rotation in unison therewith that pick up food products and expel them out the discharge wherein the wedgewire has a non-uniform, non-circular cross-section.

16. A food product processing apparatus according to claim 15 wherein the liquid heat transfer medium comprises water and food products enter and exit the processing chamber in a continuous flow process.

17. A food product processing apparatus having an inlet and a discharge and that processes a plurality of food products comprising:
a tank;
a cover that overlies the tank and defines a food product processing chamber therebetween;
a liquid heat transfer medium disposed in the tank that contacts the plurality of food products to change the temperature of the plurality of food products;
a helical auger disposed in the tank that is rotated to urge the plurality of food products toward the discharge;
a plurality of pairs of spaced apart perforate wedgewire lift buckets carried by the auger for rotation in unison therewith that pick up food products and expel them out the discharge, wherein each one of the wedgewire lift buckets comprises a plurality of spaced apart, parallel, and straight wires that define an elongate generally rectangular drainage slot between each pair of adjacent wires and a plurality of pairs of spaced apart, straight, parallel and substantially rigid wire retainers that are attached to the wires.

18. A food product processing apparatus according to claim 17 wherein each wire is substantially rigid and has a generally triangular or generally frustoconical cross-section.

19. A food product processing apparatus according to claim 18 wherein each wire has an exterior food product supporting surface that is inclined at an angle of at least two degrees relative to one of the wire retainers.

20. A food product transport mechanism for a food product processing apparatus comprising:
a helical auger, and
a plurality of spaced apart lift buckets that each have a food product-carrying platform comprised of a perforate grid structure made of wedgewire having a plurality of pairs of parallel and spaced apart wires with each wire having a generally triangular or generally frustoconical cross section and each adjacent pair of wires defining an elongate dewatering slot therebetween.

21. A food product transport mechanism for a food product processing apparatus comprising:
a helical auger; and
a plurality of spaced apart lift buckets that each have a food product-carrying platform comprised of a perforate grid structure wherein the grid structure comprises a wedgewire section having a plurality of pairs of engaged wires that define drainage perforations therebetween and where the wedgewire section of each one of the plurality of lift buckets is comprised of a plurality of pairs of spaced apart and parallel wires carried by a plurality of pairs of spaced apart and parallel wire clips with the wires spaced apart so as to define a dewatering slot between each pair of adjacent wires.

22. A food product transport mechanism according to claim 21 wherein each wire of each one of the plurality of lift buckets has a generally triangular or generally frustoconical cross section with a generally flat outer food product carrying surface.

23. A food product transport mechanism according to claim 22 wherein each wire has a notch and each wire clip has a knife edge that is received in the notch with the knife edge underlying a food product resting on the food product carrying surface of a plurality of the wires.

24. A food product transport mechanism for a food product processing apparatus comprising:
a helical auger; and
a lift bucket that has a food product carrying perforate platform comprised of wedgewire and a perforate ramp comprised of wedgewire that extends from the platform and is disposed at an angle relative to the platform; and
wherein the wedgewire of the food product carrying platform and of the perforate ramp is comprised of a plurality of pairs of spaced apart and parallel wires that are attached to a plurality of spaced apart wire retainers disposed generally transverse to the wires; and
wherein each pair of adjacent wires of the plurality of pairs of wires defines an elongate dewatering slot therebetween; and
wherein each one of the plurality of pairs of wires has a generally triangular or generally frustoconical cross section.

25. A perforate lift bucket for a food product transport mechanism of a food product processing apparatus comprising:
- a plurality of spaced apart and substantially rigid slats that support a food product thereon, with the plurality of substantially rigid slats defining a drainage perforation between each pair of adjacent slats; and
- a plurality of spaced apart tie beams that engage the slats to retain the slats in place.

26. A perforate lift bucket according to claim 25 wherein each tie beam has an engagement head that engages a portion of each one of the plurality of wires.

27. A perforate lift bucket according to claim 26 wherein each slat has a generally triangular or generally frustoconical cross section with a flat food product carrying surface and an edge spaced therefrom with a notch therein for receiving a portion of the engagement head of one of the plurality of tie beams.

28. A perforate lift bucket for a food product transport mechanism of a food product processing apparatus comprising a section of perforate wedgewire having a non-uniform and non-circular cross-section with a bend therein defining a perforate food product carrying platform and a perforate ramp.

29. A perforate lift bucket for a food product transport mechanism of a food product processing apparatus comprising:
- a plurality of pairs of spaced apart and parallel wires that each have a generally triangular or generally frustoconical cross section and a generally flat food product carrying surface with each pair of adjacent wires defining an elongate and generally rectangular drainage slot therebetween that has a narrow throat disposed adjacent the food product carrying surface and an expanded drainage chamber; and
- a plurality of pairs of spaced apart and parallel wire retainers to which the plurality of pairs of wires are attached with each one of the wire retainers having a knife edge disposed toward each one of the plurality of pairs of wires.

30. A perforate lift bucket according to claim 29 wherein each one of the plurality of pairs of wires has a base in contact with the plurality of pairs of wire retainers and the food product carrying surface of each wire is wider than the base of the wire and each wire further comprises a pair of sidewalls that taper toward each other adjacent the base.

31. A lift bucket attached to a rotatable auger of a food product processing apparatus comprising:
- a plurality of pairs of spaced apart and parallel food product carrying wires that each have a generally flat food product carrying surface with each pair of adjacent wires defining an elongate drainage slot therebetween having a width where it is narrowest of at least 0.03 inches; and
- a plurality of pairs of spaced apart and parallel support wires that underlie the plurality of pairs of food product carrying wires with the support wires disposed generally perpendicularly relative to the plurality of pairs of food product carrying wires and joined by a weld to each one of the plurality of pairs of food product carrying wires.

32. A method of processing a plurality of food products in a food product processing apparatus comprising:
- (a) providing a tank having an inlet and a discharge; a liquid heat transfer medium disposed in the tank; a helical auger disposed in the tank; and a plurality of lift buckets comprised of perforate wedgewire disposed adjacent the discharge, the wedgewire having a non-uniform and non-circular cross-section;
- (b) introducing a plurality of food products into the tank through the inlet;
- (c) rotating the auger at a rotational speed of at least five RPM; and
- (d) expelling the food products out the discharge using one of the wedgewire lift buckets.

33. A method of processing a plurality of food products according to claim 32 wherein the wedgewire lift buckets rotate in unison with the auger.

34. A method of processing a plurality of food products in a food product processing apparatus comprising:
- (a) providing a tank having an inlet and a discharge; a liquid heat transfer medium disposed in the tank; a helical auger disposed in the tank; and a plurality of perforate lift buckets disposed adjacent the discharge that each are comprised of wedgewire made of a plurality of pairs of straight and parallel wires attached to a plurality of generally transverse wire clips and that each have a perforated open area of at least 24%;
- (b) introducing a plurality of food products into the tank through the inlet;
- (c) rotating the auger at a rotational speed of at least five RPM; and
- (d) expelling food products out the discharge using each one of the perforate lift buckets.

35. A method of processing a plurality of food products according to claim 34 wherein the auger and the lift buckets both move at the same time.

* * * * *